Nov. 10, 1964 N. P. DARASH 3,156,146
MACHINE TOOL DRIVES
Filed Oct. 12, 1959 4 Sheets-Sheet 1

INVENTOR.
NICHOLAS P. DARASH
BY Hudson, Boughton,
Williams, Davids & Hoffmann
ATTORNEYS Nov. 10, 1964  N. P. DARASH  3,156,146
MACHINE TOOL DRIVES
Filed Oct. 12, 1959  4 Sheets-Sheet 2

INVENTOR.
NICHOLAS P. DARASH
BY Hudson, Boughton,
Williams, David & Hoffmann
ATTORNEYS INVENTOR.
NICHOLAS P. DARASH
BY Hudson, Boughton,
Williams, David & Hoffmann
ATTORNEYS

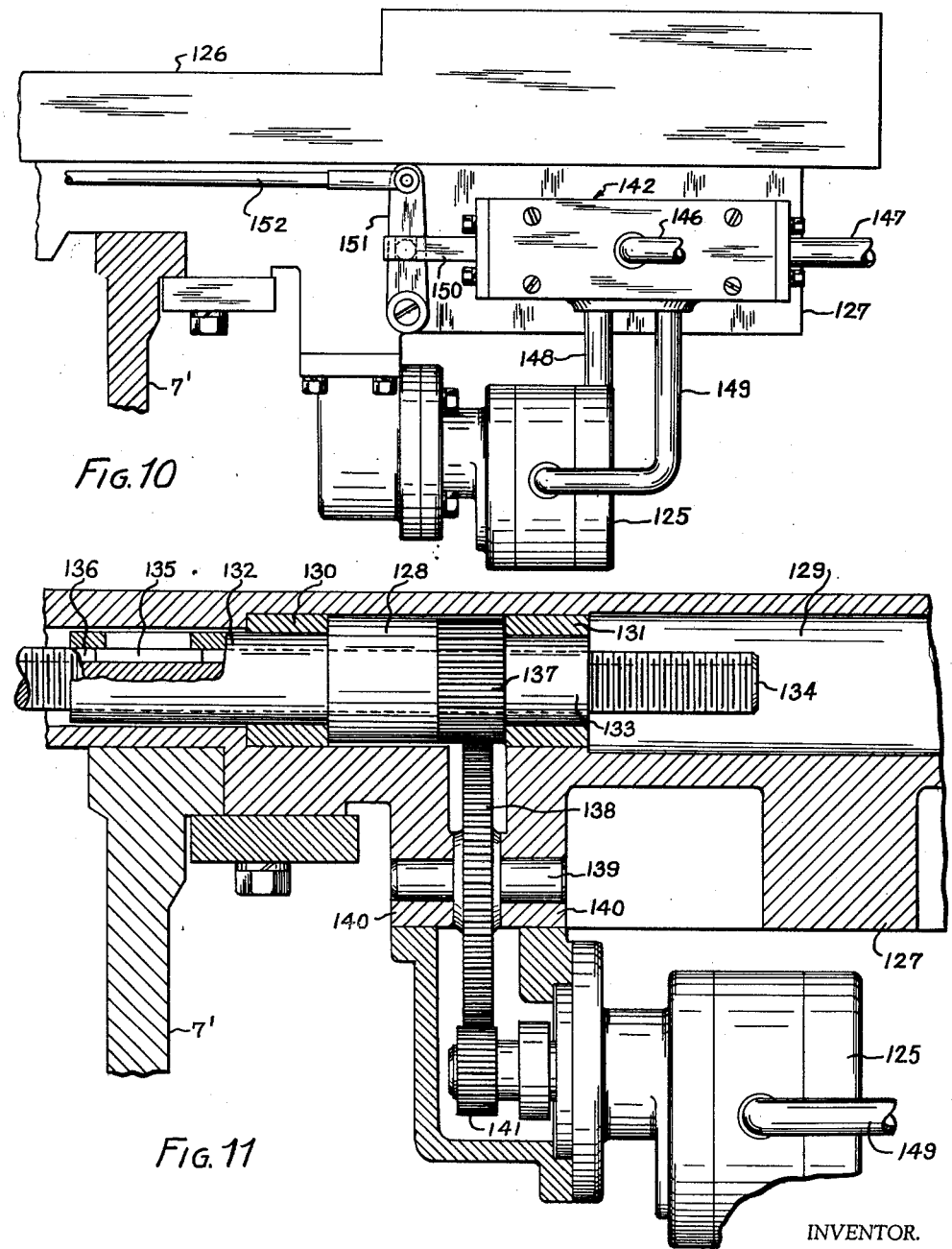

United States Patent Office

3,156,146
Patented Nov. 10, 1964

3,156,146
MACHINE TOOL DRIVES
Nicholas P. Darash, Cleveland, Ohio, assignor to The Warner & Swasey Company, Cleveland, Ohio, a corporation of Ohio
Filed Oct. 12, 1959, Ser. No. 845,688
2 Claims. (Cl. 82—24)

This invention relates to machine tool drives and has particular relation to machine tool drives including hydraulic motors of the rotary type for effecting movement of tool slides relative to workpieces.

In the present invention a machine tool drive of improved construction is provided for effecting movement of a tool slide with respect to the rotated workpiece. The improved drive includes a hydraulic motor of the rotary type which is operatable to effect a rapid traverse movement of a tool slide. The drive includes further cooperating screw and nut elements with one of said elements arranged for rotation with respect to the other element in response to operation of the hydraulic motor to effect movement of the tool slide. In one embodiment of the invention the hydraulic motor is supported by the tool slide adjacent the front end thereof to effect rotation of the screw which is rotatably carried by the slide with respect to the nut which is fixed to the carriage.

In machine tools such as lathes it is desirable to effect movement of a tool slide relative to a workpiece at a number of different preselected speeds. According to the present invention the improved drive consists of a plurality of drives each effective to move the tool slide at a separate speed. In the present invention a hydraulic rotary motor is utilized to effect a rapid traverse movement of the tool slide in a direction extending transversely of the axis of the machine tool spindle. A manual drive is also provided for effecting a slower movement of the slide in such direction. A third drive is operatable to effect movement of the tool slide in the transverse direction at a feed speed which is conventionally proportional to the speed of rotation of the work-supporting spindle. Each of these drives is effective to rotate the screw with respect to the fixed nut for moving the tool slide.

The hydraulic motor utilized is preferably of the twin gear type with one of the gears operatively connected to the rotatable screw. A valve assembly is operated by a suitable control for providing neutral, forward and reverse conditions of the hydraulic motor. The arrangement is such that the hydraulic motor when in neutral condition functions in the manner of a pump when the feed drive or the manual drive is in operation so that the hydraulic fluid for the motor is recirculated between the input and output connections of the motor. The employment of a hydraulic rotary motor permits simultaneous operation of the feed drive and the hydraulic rapid traverse drive without damage to either inasmuch as hydraulic motors of this type stall relatively easily and consequently the hydraulic motor is driven by the feed drive at the feed speed if the motor is not in neutral condition. As a consequence, the conventional interlock ordinarily provided between the feed and rapid traverse drives may be eliminated by the present invention and the hydraulic motor may be continuously drivingly connected to the screw.

A further embodiment of the invention contemplates that the hydraulic motor is secured to the carriage to effect rotation of a screw secured to the slide with respect to a nut fixed to the carriage against rotation. The slide in this embodiment is a contour follower slide with the motor mounted beneath the carriage adjacent the rear end of the slide.

It is therefore an object of the invention to provide a machine tool drive of improved construction for moving a tool slide relative to a workpiece.

It is a further object of the invention to provide a machine tool drive including a hydraulic rotary motor for moving a tool slide with respect to a workpiece at a rapid traverse speed.

It is another object of the invention to provide a machine tool including a cross tool slide with a hydraulic rotary motor supported by the slide operatable to effect cross movement of the slide at a rapid traverse speed.

It is still another object of the invention to provide a machine tool including a plurality of drives for moving a tool slide at feed and rapid traverse speeds wherein the drives can be operated simultaneously without damage to the drives.

It is a still further object of the invention to provide a machine tool as defined in the preceding object wherein the rapid traverse movement of the tool slide is effected by a hydraulic rotary motor.

Other objects of the invention will become apparent from the following description taken in conjunction with the accompanying drawings in which FIG. 1 is a view in elevation of a machine tool embodying the teachings of the invention;

FIG. 10 is a view in elevation with parts broken away of a machine tool showing a different arrangement of hydraulic motor and valve device for moving a contour follower slide;

FIG. 11 is a view in section showing the arrangement of the motor of FIG. 10 with a screw for moving the slide.

Although the present invention is susceptible of many and varied uses, the invention will be described in connection with a machine tool such as a lathe having a rotatable spindle for rotatably supporting a workpiece with a tool-carrying slide which is mounted for reciprocation toward and away from the workpiece in directions transverse to the axis of the spindle. Generally speaking, the present invention involves the provision of improved drive means for effecting reciprocation of the tool slide. The improved drive includes in part a rotary hydraulic motor for effecting a rapid traverse movement of the tool slide with respect to the workpiece. The drive also includes a mechanical arrangement for effecting movement of the tool slide at a feed speed which is conventionally proportional to the speed of rotation of the spindle. A manual drive is also included for effecting a slow and accurate movement of the tool slide with respect to the work. The provision of a hydraulic motor of the rotary type for effecting a rapid traverse movement of the tool slide is highly advantageous in that conventional interlocks heretofore provided between the feed and rapid traverse drives is no longer necessary.

Figure 1:
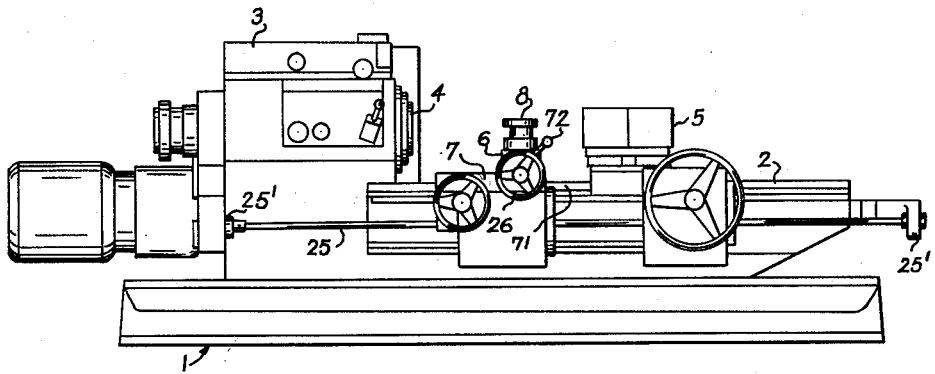

Referring now to the drawings there is illustrated in FIG. 1 a machine tool represented generally by the numeral 1 which, for example, may be in the form of a lathe. The machine tool includes the conventional bed 2 upon which is supported a headstock 3 for rotating a spindle 4 at a desired speed. A suitable turret 5 is provided for supporting a plurality of tools which are utilized to operate upon a workpiece rotatably mounted by the spindle. The turret 5 is conventionally supported for indexing upon a turret slide which is slidable longitudinally of the spindle 4. A tool-supporting cross slide 6 is mounted by a carriage 7 for reciprocation relative to the carriage 7 towards and away from the workpiece in directions transverse to the axis of the spindle. If desired, the carriage 7 may be mounted on spaced front and rear ways 7' for sliding movement longitudinally of the spindle axis. The cross slide 6 carries a suitable tool holder 8 for supporting tools which operate on the workpiece.

In the present invention improved drive means are provided for effecting reciprocation of the cross slide 6 with respect to the workpiece. The drive means is operatively connected to a driving system which when operated by the drive means effects the desired movement of the cross slide. A number of arrangements for the driving system may be utilized. For example, a threaded nut may be rotatably supported by the carriage 7 in threaded relation with a screw which is supported by the slide 6 so as to be fixed against rotation. When the nut is rotated by operation of the drive means the screw is displaced longitudinally of its axis to carry therewith the cross slide 6 relative to the carriage 7. In the embodiment illustrated in FIG. 2 the driving system is illustrated in the form of a screw which is rotatably carried by the cross slide in threaded relation with a nut fixed to the carriage so that when the screw is rotated it is displaced relative to the nut to carry the cross slide therewith.

Figure 2:
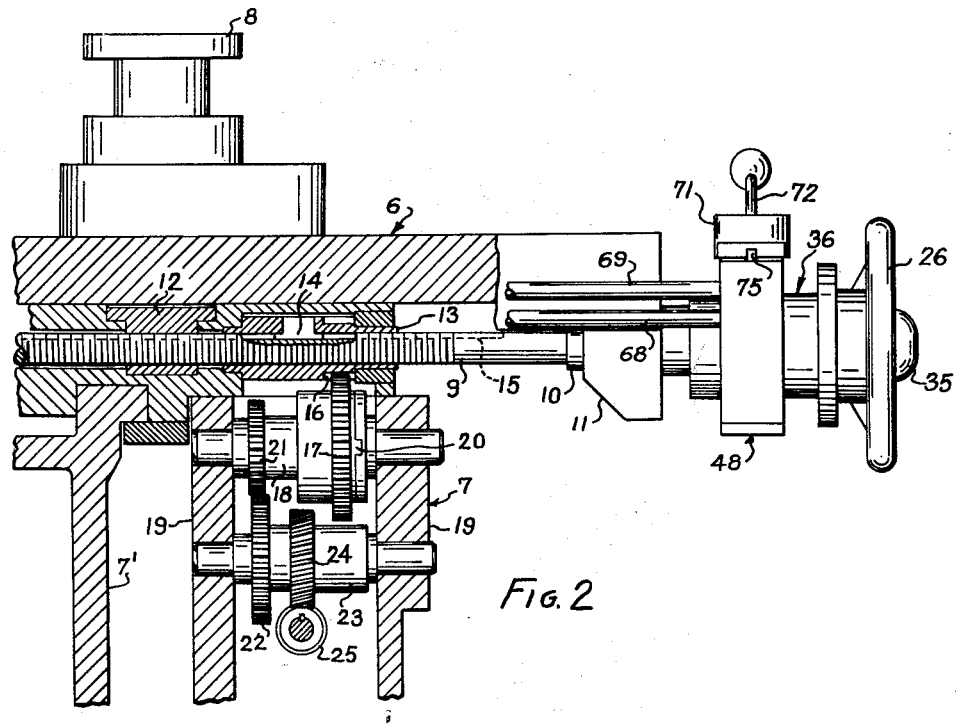
FIG. 2 is a view in elevation with parts shown in section of a portion of the tool of FIG. 1, showing in particular the screw and the feed drive.

In the embodiment illustrated in FIG. 2 a screw 9 is journalled for rotation in a suitable bushing 10 which is fixed within an opening of a depending portion 11 of the cross slide 6. The screw 9 includes a threaded portion which is in threaded engagement with threads of a bore of a nut 12 which is secured to the carriage 7 in fixed relation therewith. The screw 9 also extends through a bushing 13 which is rotatably supported by the carriage 7 and which is keyed to the screw 9. For this purpose the bushing 13 includes a key 14 which extends into an elongated keyway 15 of the screw. With this arrangement the bushing 13 rotates with the screw 9 and the screw 9 is displaceable longitudinally of the bushing 13 relative to the bushing. It is noted that the keyway 15 in the screw 9 is sufficiently elongated so as to allow a substantial displacement of the screw through the bushing 13.

In the present invention the improved drive means for reciprocating the cross slide 6 includes in part a mechanical drive operable to move the cross slide at a feed speed. Conventionally the feed drive is operated in timed relation with rotation of the spindle 4 so that the feed speed of movement of the cross slide is proportional to the rotational speed of the spindle. In the embodiment illustrated the feed drive operates upon the bushing 13 to effect rotation of the screw 9. For this purpose the bushing 13 includes a plurality of gear teeth 16 about its periphery which mesh with teeth of a gear 17 mounted upon a shaft 18 which is journalled by spaced portions 19 of the carriage 7. A conventional suitable clutch arrangement 20 is associated with the gear 17 which is operable to allow rotation of the gear 17 relative to the shaft 18 or to fix the gear 17 to the shaft 18 so that rotation of the shaft 18 will effect rotation of the gear 17.

The feed drive also includes a gear 21 fixed to the shaft 18 in meshing engagement with a gear 22 fixed to a shaft 23 which extends parallel to the shaft 18 thereneath and which is journalled by the spaced carriage portions 19 adjacent the front way 7' shown in FIG. 2. An additional gear 24 is also secured to the shaft 23 in meshing relation with a threaded portion of a feed shaft 25 which, as shown in FIG. 1, extends longitudinally of the spindle 4 and is journalled in spaced extending portions 25' of the machine tool. The feed shaft 25 is conventionally rotated at a speed which is proportional to the speed of rotation of the spindle. With this arrangement the feed speed of movement of the cross slide 6 will be proportional to the speed of rotation of the spindle.

Figure 3:
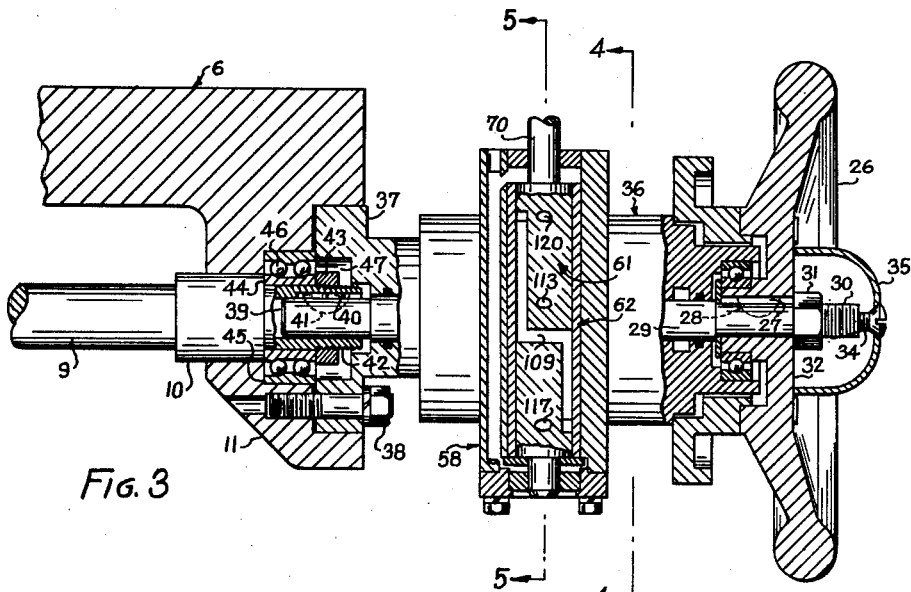
FIG. 3 is a view with parts shown in section of the hydraulic motor and the connection of the motor shaft to the screw for moving the tool slide.

Means are also provided to permit a manual rotation of the screw 9 so as to move the cross slide 6 at a slow rate of speed. In the embodiment illustrated a hand wheel 26 is provided for this purpose which is operatively connected to the screw 9 so that rotation of the hand wheel will effect rotation of the screw. As best shown in FIG. 3, the hand wheel includes a depending key 27 which extends into a keyway 28 formed in a shaft 29 which is connected to the screw 9 in a manner such that rotation of the shaft 29 will effect rotation of the screw. The shaft 29 includes a threaded end 30 extending through a nut 31 which engages a surface 32 of the hand wheel. The shaft 29 is formed with a threaded bore at its outer end in which is received a screw 34 having a head projecting through an opening of a cap 35 which bears against the surface 32 when the screw 34 is tightened. The shaft 29 extends through a central cavity of the hand wheel and through a housing 36 which has an end section 37 secured within a recess of the depending cross slide portion 11 by suitable screws 38 so that the hand wheel 26, the shaft 29, and the housing 36 are rigidly mounted by means of the cross slide 6.

In order to connect the shaft 29 to the screw 9, the screw 9 includes a bore into which an end of the shaft 29 extends. A key 40 projects from the wall of the bore of the screw into a keyway 41 formed in the adjacent end of the shaft 29. This end of the screw 9 is provided with threads 42 which threadably receive a nut 43 which clamps an inner bearing race 44 surrounding the screw 9 against the bushing 10. The inner race 44 is spaced from an outer bearing race 45 secured within the recess of the depending portion 11 by means of the end 37 of the housing 36. A substantially frictionless bearing is provided by balls 46 located in the space between the races 44 and 45. With the described arrangement, rotation of the shaft 29 will also effect rotation of the screw 9 therewith relative to the cross slide 6, and the screw 9 and shaft 29 are fixed against substantial longitudinal displacement relative to the cross slide.

Figures 4, 5:
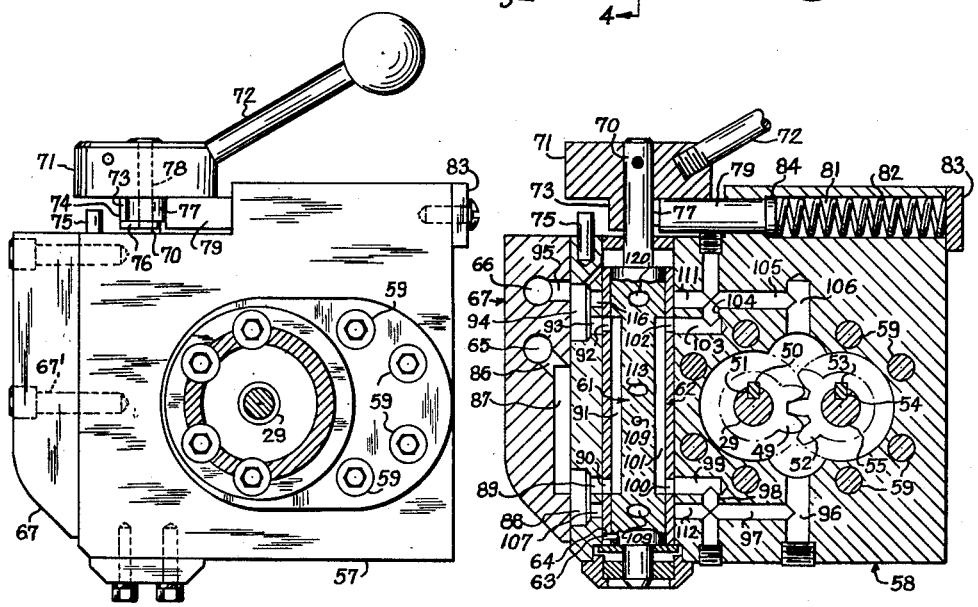
FIG. 4 is a view taken along the line 4—4 of FIG. 3.
FIG. 5 is a view in section taken along the line 5—5 of FIG. 3.
Figure 6:
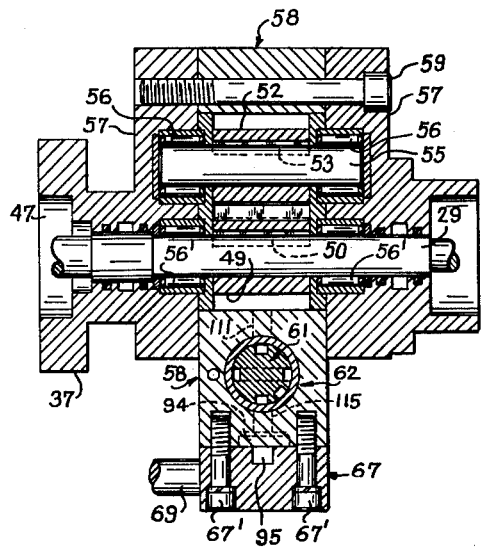
FIG. 6 is a view in top plan with parts removed and with parts shown in section of the hydraulic motor and the associated valve device.

According to the present invention the drive means for reciprocating the cross slide also includes a hydraulic motor of the rotary type which is conveniently supported by the cross slide 6 for reciprocation therewith. The hydraulic motor is represented generally by the reference numeral 48 and is of the twin gear type as shown in FIG. 5, including a gear 49 which is secured in fixed relation to the shaft 29. For this purpose the gear 49 includes a key 50 located within a keyway 51 of the shaft 29. The motor includes also a gear 52 which is rotatably mounted in meshing relation with the gear 49. To this end the gear 52 includes a key 53 positioned in a keyway 54 of an idler shaft 55 which is parallel to the shaft 29 as illustrated in FIG. 6 and which is journalled for rotation by spaced bearings 56 mounted within spaced parts 57 of the housing 36. The shaft 29 is similarly rotatably supported by bearings 56' carried by the parts 57. The keys 50 and 53 preferably have length dimensions substantially equal to the lengths of the gears 49 and 52.

As best shown in FIG. 6, the gears 49 and 52 are positioned within a cavity formed in a valve housing 58 which is secured intermediate the portions 57 as by screws 59 which extend through openings of the portions 57 and housing 58. With this arrangement, when a suitable fluid, such as oil, under pressure is introduced into the cavity containing the gears 49 and 52, the gears will be rotated to effect a corresponding rotation of the shaft 29 and the screw 9.

In order to control the flow of fluid under pressure into the cavity containing the gears of the hydraulic motor there is provided a valve device including a cylindrical valve block 61 positioned within the bore of a tubular sleeve 62, which in turn is positioned within a cylindrical bore formed in the valve housing 58. The valve block 61 and the sleeve 62 are keyed together as shown in FIG. 5 such as by a pin 63 secured to the valve block to extend into a slot 64 of the sleeve 62 so that the valve block and the sleeve are rotatable about their longitudinal axes as a unit to control the passage of pressure fluid to the gears 49 and 52 of the hydraulic motor. The valve block and the sleeve control the flow of fluid from a pressure port 65 through the cavity containing the gears 49 and 52 to a drain port 66. Depending upon the direction of rotation of the valve block and the sleeve, the hydraulic motor may have a neutral, forward or a reverse rotary condition. The ports 65 and 66 are formed in a block 67 which is secured to the valve housing 58 as by screws 67' and are connected respectively to a pressure conduit 68 and to a drain conduit 69 which lead to a suitable source of pressure fluid which may, for example, be located within the head stock 3.

Figure 7:
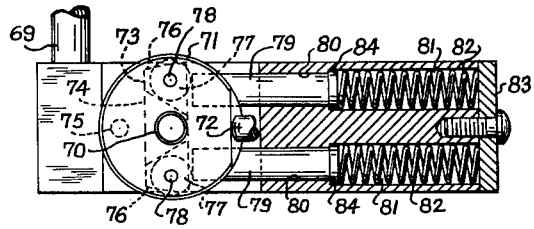
FIG. 7 is a view in top plan with parts removed and with parts shown in section of a portion of the valve control assembly.

In order to effect rotation of the valve block 61 and the sleeve 62, a rotatable shaft 70 is secured to the valve block and has fixed to its outer end a knob 71 to which is attached a lever 72, as shown in FIG. 5. The knob 71 includes a projection 73 extending downwardly therefrom having a flat surface 74 arranged to engage a pin 75 fixed to the valve housing 58. The surface 74 and the pin 75 provide a stop arrangement to limit rotation of the valve block 61 between two positions spaced 90° angularly about the axis of the block 61 which are effective to establish respectively the forward and the reverse operating conditions of the motor. The projection 73 includes a pair of spaced wings 76, best shown in FIG. 7, which support rollers 77 rotatably mounted by pins 78 extending through the knob 71, the rollers 77 and the wings 76.

The valve block and the sleeve are normally biased into an angular position intermediate the positions corresponding to the forward and reverse conditions wherein they establish a neutral condition of the hydraulic motor. To this end a pair of rods 79 are slidable within openings 80 of the housing 58 which communicate with enlarged openings 81 containing coil springs 82 which engage a detachable end wall 83 and heads 84 of the rods 79 which in turn engage the shoulders formed between the openings 80 and 81. With this arrangement the springs are in compression to normally bias the heads of the rods 79 into engagement with the shoulders so as to maintain the rods 79 in engagement with the rollers 77 to position the shaft 70 for establishing the neutral condition of the motor.

Figure 8:
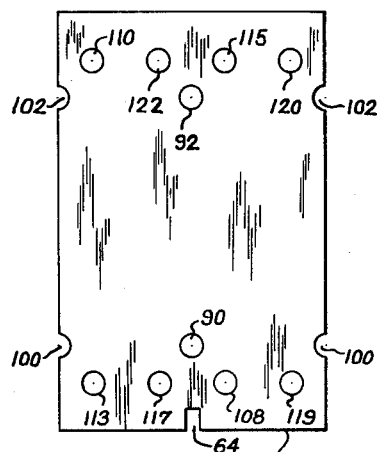
FIG. 8 is a view showing the sleeve portion of the valve device in developed form illustrating the relative positions of fluid conducting ports therein.
Figure 9:
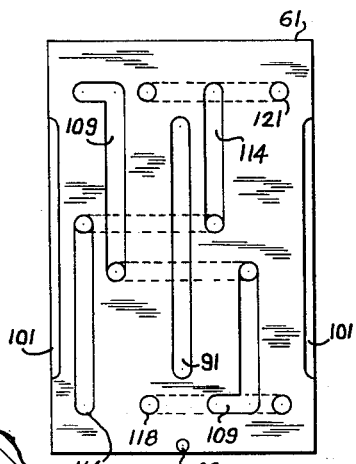
FIG. 9 is a view showing the valve portion of the valve device in developed form illustrating the relative positions of fluid conducting ports therein.

The valve block 61 and the sleeve 62 are illustrated in the drawings in positions effective to establish the neutral position of the motor. For this neutral position the hydraulic motor is ineffective to rotate the screw 9 and will only be rotated in response to operation of the feed drive or in response to rotation of the hand wheel 26. The valve block 61 and the sleeve 62 each includes a plurality of ports which are adapted to cooperate with additional ports located within the housing 58 and the block 67 to control the passage of pressure fluid to the motor. In FIGS. 8 and 9 there is illustrated respectively the sleeve 62 and the valve block 61 in developed form. In other words, these figs. show the valve block and the sleeve as they would appear if slit longitudinally at the right as viewed in FIG. 5 and unwrapped to a planar configuration. When the valve block and sleeve are in positions for establishing the neutral condition the fluid circuit may be traced as follows. The fluid under pressure will enter the port 65 and will be conducted downwardly as viewed in FIG. 5 through the ports 86 and 87 of the block 67 into passages 88 and 89 of the valve housing 58 and through a lower opening 90 of the sleeve 62. The opening 90 is aligned with a groove 91 formed in the valve block which communicates with an upper opening 92 of the sleeve through which the fluid flows into the drain port 66 through communicating passages 93 and 94 of the housing 58. As a result, the pressure fluid is not applied to the gears of the motor but is bypassed through the valve block and the sleeve.

When the motor is in a neutral condition and the hand wheel 26 or the feed drive is being operated to reciprocate the cross slide, the resulting rotation of the screw 9 will effect rotation of the gear 49 and the gear 52 which is meshing therewith. Such gear rotation is effective to circulate fluid trapped within the cavity containing the gears through a series of ports so that the fluid is continuously recirculated through the motor when the motor is in a neutral condition. For example, let it be assumed that the shaft 29 is being rotated in a counterclockwise direction as viewed in FIG. 5. For this assumption then fluid in the cavity containing the gears will be forced downwardly through ports 96, 97, 98 and 99 of the housing 58 into a passage 100 of the sleeve 62 upwardly through a groove 101 of the valve block through an opening 102 of the sleeve and through ports 103, 104, 105 and 106 of the housing 58 downwardly back to the cavity containing the gears.

In order to operate the hydraulic motor for reciprocating the cross slide at a rapid traverse speed the valve block and sleeve must be rotated from their illustrated positions to positions wherein the forward or reverse rotary conditions of the motor are established as desired. Let it be assumed that it is desired to retract the cross slide away from the workpiece at a rapid traverse speed, and that the shaft 29 must be rotated in a counterclockwise direction as viewed in FIG. 5 to accomplish this. Then the lever 72 is grasped and rotated in a clockwise direction as viewed from the upper end of FIG. 5 through an angle of 45° to effect a corresponding rotation of the block 61 and sleeve 62. The pressure fluid will then pass downwardly through the ports 86, 87 and 88 into a passage 107 of the housing 58 through an opening 108 of the sleeve, a port 109 of the valve block, an opening 110 of the sleeve and through ports 111, 105 and 106 of housing 58 into the gear cavity. The fluid under pressure will effect counterclockwise rotation of the gear 49 and the shaft 29 and will flow through ports 96, 97 and 112 of housing 58, an opening 113 of the sleeve, a port 114 of the valve block, an opening 115 of the sleeve and back to the drain port 66 through ports 116, 94 and 95.

If it is desired to rotate the shaft 29 in the clockwise direction as viewed in FIG. 5 to advance the cross slide toward the workpiece then the lever 72 is rotated in a counterclockwise direction as viewed from the top of FIG. 5 through an angle of 45° so as to rotate the valve block and sleeve therewith in such direction. For this condition the pressure fluid will flow from the port 65 through the ports 86, 87, 88 and the passage 107 into an opening 117 of the sleeve, a port 118 of the valve block, an opening 119 of the sleeve and through the ports 112, 97 and 96 to the gear chamber. As a result, the gear 49 will be rotated in the clockwise direction and the fluid will be drained through the ports 106, 105 and 111 of the housing 58, an opening 120 of the sleeve, a port 121 of the block 61, an opening 122 of the sleeve and the ports 116, 94, 95 and 66.

It is noted that when the lever 72 is moved from the position shown corresponding to the neutral condition to either of the positions corresponding to the forward and reverse conditions, that the lever must be held in such position. This results from the fact that one of the springs 82 is compressed due to displacement of one of the rods 79 toward the right as viewed in FIG. 7 in response to movement of the lever. Such compression of one of the springs tends to return the lever to the neutral position and will in fact do so if the lever is released.

In operation, if it is desired to move the slide at a rapid traverse speed the clutch 20 is operated so as to free the gear 17 for rotation relative to the shaft 18. The lever 72 is then moved from the neutral position to either the forward or reverse position as desired and held in such position. When the slide has been moved at a rapid traverse speed to the desired position, the lever 72 is released and automatically returns to the neutral position to stop the motor 48. If it is now desired to move the slide at the feed speed the clutch 20 is operated to fix the gear 17 to the shaft 18 so that the gear 17 will rotate with the shaft 18. The feed shaft 25 is then rotated, which effects rotation of the screw 9 and advancement of the slide 6 at the feed speed. During this time the gears 49 and 52 of the motor are also being rotated to effect the recirculation of fluid therethrough.

If the lever 72 is accidentally moved from its neutral position during operation of the feed drive no damage will result inasmuch as the motor 48 will continue to rotate at the feed speed determined by the feed drive. If the motor 48 is being operated and the clutch 20 is accidentally operated to connect the gear 17 to the shaft 18, no damage will occur inasmuch as the motor 48 will quickly stall and rotate at the feed speed.

Figure 12:
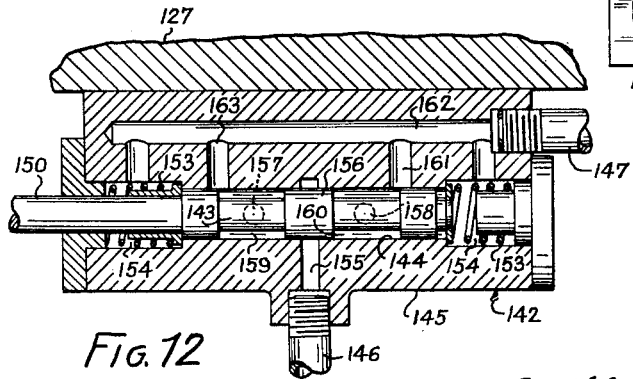
FIG. 12 is a view in section of the valve device shown in FIG. 10.

In FIGS. 10 through 12 there is illustrated another embodiment of the present invention wherein a hydraulic motor 125 of the rotary type is employed to effect movement of a contour follower cross slide 126 at a rapid traverse speed in a direction transverse to the spindle axis. In this embodiment the motor 125 is supported by a carriage 127 beneath the rear end of the slide 126 which is mounted by the carriage 127 for movement relative thereto. The carriage 127 of FIG. 11 may constitute the rear portion of a carriage having the front portion 7 shown in FIG. 2.

The motor 125 is operatable to effect rotation of a threaded screw mounted by the slide 126 relative to a nut which is fixed to the carriage 127 against rotation. To this end a tubular sleeve 128 is rotatably supported in a bore 129 of the carriage 127 and is held against longitudinal displacement along the bore 129 by a pair of bushings 130 and 131 located at opposite ends of the enlarged central portion of the sleeve 128. The bushings 130 and 131 are secured to the carriage in any suitable manner and rotatably receive respectively reduced end portions 132 and 133 of the sleeve 128 through which extends a screw 134 in threaded relation with a nut, which may be the nut 12 in FIG. 2. The screw 134 may comprise the rear portion of the screw 9 shown in FIG. 2. The screw 134 is fixed to the sleeve 128 for rotation therewith by means of a key 135 projecting from the sleeve portion 132 into an elongated keyway 136 formed in the screw.

The sleeve 128 is formed with gear teeth 137 about the periphery of the central portion which mesh with teeth of a gear 138 supported for rotation about a shaft 139 fixed in spaced parts 140 of the carriage. The gear 138 meshes with a gear 141 attached to the shaft of the motor 125. With the described arrangement operation of the motor 125 will effect rotation of the sleeve 128 and the screw 134 which will consequently be displaced longitudinally of the nut 12.

The screw 134 is operatively connected to the slide 126 in any suitable manner so that the slide will move with the screw in response to operation of the motor 125. For example, the screw 134 may be connected to the slide 126 in the same manner that the screw 9 is connected to the slide 6 in the previous embodiment, through the agency of the bushing 10 in the portion 11. FIG. 11 may be considered as the rear portion of the carriage assembly of which FIG. 2 is the front portion so that the screw 134 of FIG. 11 constitutes an extension of the left hand end of the screw 9 in FIG. 2. It is understood that in the embodiment of FIG. 11 the feed drive and the manual drive may be employed in the manner of FIG. 2 with the motor 48 of course omitted.

Operation of the motor 125 is controlled by a valve device 142 which is supported by the carriage 127 at a side thereof above the motor 125 as shown in FIG. 10. The valve device is capable of establishing neutral, forward and reverse conditions of the motor and includes a valve block 143 of generally cylindrical configuration which is slidable within a cylindrical bore 144 extending through a housing 145 secured to the carriage 127. The block 143 and the housing 145 include a number of fluid-conducting ports which connect a pressure conduit 146 and a drain conduit 147 which lead to a suitable source of pressure fluid to a forward conduit 148 and a reverse conduit 149 which lead to the motor 125.

In order to slide the block 143 within the bore 144 a shaft 150 has one end fixed to the block 143 with its other end pivotally connected to a link 151 which has one end pivotally secured to the carriage 127. The other end of the link 151 is pivotally attached to one end of a rod 152 having its other end secured to a suitable control lever which when actuated by an operator or automatically as desired effects displacement of the block 143 between three positions in the bore 144 for establishing neutral, forward and reverse conditions of the motor. The block 143 is maintained in a normal central position as illustrated in FIG. 12 corresponding to the neutral condition by means of a pair of coil springs 153 held in compression within enlarged sections 154 of the bore 144.

When the block 143 is in its illustrated central position fluid such as oil under pressure entering the conduit 146 and a communicating bore 155 is prevented from passing into the bore 144 by a central portion 156 of the block 143. Consequently, the fluid cannot pass through bores 157 and 158 of the housing 145 which lead respectively from the bore 144 to the forward and reverse conduits 148 and 149. As a result, the motor 125 cannot operate in either the forward or reverse conditions.

If a forward condition of the motor is desired the block 143 is shifted to the right as viewed in FIG. 12 against the bias of the right hand one of the springs 153 to a position wherein fluid from the conduit 146 and the bore 155 may enter the bore 144 through an annular groove 159 of the block 143 and flow through the bore 157, the forward conduit 148, the motor 125, the reverse conduit 149, the bore 158, an annular groove 160 of the block 143, a bore 161 of the housing 145, and a cross port 162 of the housing to the drain conduit 147. As a result, the motor 125 is in a forward condition to effect rotation of the sleeve 128 in a direction for advancing the slide 126 toward the workpieces at a rapid traverse speed.

A reverse condition of the motor is established by sliding the block 143 toward the left as viewed in FIG. 12 from its central position to an extent such that fluid from the port 155 may enter the groove 160 and flow through the port 158, the reverse conduit 149, the motor 125, the forward conduit 148, the bore 157, the groove 159, a port 163 of the housing, and the port 162 to the drain conduit 147. This flow of fluid causes the reverse condition of the motor which effects retraction of the slide from the workpiece at a rapid traverse speed.

It is observed that when the motor is rotated as a result of operation of either the feed drive or the manual drive that fluid is circulated through the motor when it is in a neutral condition. This may be explained by considering that the ports 157 and 158 which lead to the motor are connected through the grooves 159 and 160 and the ports 161, 162 and 163. The arrangement illustrated in FIGS. 10 through 12 possesses the same advantages found in the device shown in FIGS. 1 through 9.

Although the invention has been described with reference to certain specific embodiments thereof, numerous modifications are possible and it is desired to cover all modifications falling within the scope of the appended claims.

Having described my invention, I claim:

1. In a machine tool, slide means, carriage means supporting the slide means for reciprocating movement relative thereto, cooperating screw and nut elements, one of said elements being rotatably carried by one of said means, the other of said elements being fixed against rotation to the other of said means, a hydraulic motor supported by said one of said means and having a member rotatable through complete revolutions in a fluid chamber in response to the flow of fluid therethrough, said fluid chamber having fluid ports communicating therewith for directing fluid into and from the fluid chamber, said member being operatively and fixedly connected to said one element for rotation at all times therewith and to effect rotation thereof upon rotation of said member in response to fluid flow through said chamber to thereby effect movement of said slide means relative to said carriage means at a rapid traverse speed, power actuated additional drive means for rotating said one element and said member to effect movement of said slide means at a feed speed, a handwheel operatively connected to said one element for rotating said one element and said member to effect movement of said slide means, and control means controlling the flow of fluid through said fluid chamber including a valve member having a neutral position wherein said valve member connects said fluid ports and provides a closed path for fluid in said fluid chamber so that the fluid in said chamber flows through said path when said valve member is in said neutral position and said power actuated drive means is operated or said handwheel is turned and having an actuated position connecting said fluid ports to a source of fluid pressure and to exhaust to provide fluid flow through said fluid chamber to effect rotation of said member in said chamber.

2. In a machine tool, slide means, carriage means supporting the slide means for reciprocating movement relative thereto, cooperating screw and nut elements, said screw element being rotatably carried by one of said means and said nut element being fixed against rotation of the other of said means, a hydraulic motor supported by said one of said means and having a shaft coaxial with said screw and fixedly connected thereto for rotation therewith and extending outwardly of said motor away from said screw to terminate in an outer end and a member rotatable through complete revolutions in a fluid chamber in response to the flow of fluid therethrough, said fluid chamber having fluid ports communicating therewith for directing fluid into and from the fluid chamber, said member being fixedly connected to said shaft for rotation therewith at all times and to effect rotation thereof upon rotation of said member in response to fluid flow through said chamber to thereby effect movement of said slide means relative to said carriage means at a rapid traverse speed, power actuated additional drive means for rotating said one element and said member to effect movement of said slide means at a feed speed, a handwheel operatively connected to said outer end of said shaft for rotating said one element and said member to effect movement of said slide means, and control means controlling the flow of fluid through said fluid chamber including a valve member having a neutral position wherein said valve member connects said fluid ports and provides a closed path for fluid in said fluid chamber so that the fluid in said chamber flows through said path when said valve member is in said neutral position and said power actuated drive means is operated or said handwheel is turned and having an actuated position connecting said fluid ports to a source of fluid pressure and to exhaust to provide fluid flow through said fluid chamber to effect rotation of said member in said chamber.

References Cited in the file of this patent

UNITED STATES PATENTS

| | | |
|---|---|---|
| 1,510,129 | Argy | Sept. 30, 1924 |
| 1,889,930 | Morton | Dec. 6, 1932 |
| 1,987,186 | Flanders | Jan. 8, 1935 |
| 2,048,107 | Collins | July 21, 1936 |
| 2,069,701 | Emmons | Feb. 2, 1937 |
| 2,134,024 | Bogart | Oct. 25, 1938 |
| 2,334,616 | Fiorelli | Nov. 16, 1943 |
| 2,354,372 | Groene et al. | July 25, 1944 |
| 2,390,589 | Holmes | Dec. 11, 1945 |
| 2,452,674 | Nenninger | Nov. 2, 1948 |
| 2,459,902 | Tucker | Jan. 25, 1949 |
| 2,639,694 | Johnson | May 26, 1953 |
| 2,640,377 | Millholland | June 2, 1953 |
| 2,736,243 | Armitage | Feb. 28, 1956 |
| 2,967,463 | Jensen | Jan. 10, 1961 |